F. A. MACON.
PNEUMATIC TIRE.
APPLICATION FILED FEB. 20, 1911.
997,398.
Patented July 11, 1911.
2 SHEETS—SHEET 1.
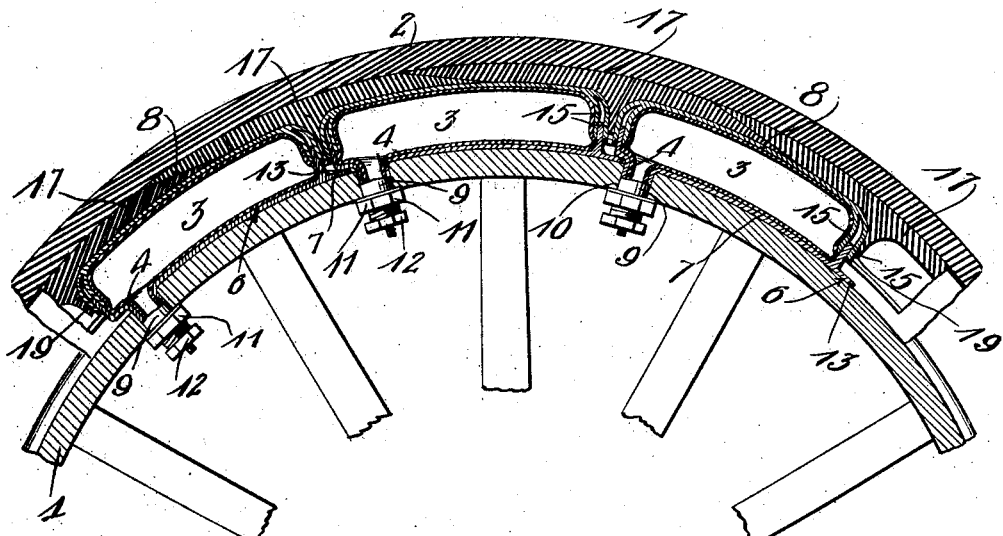
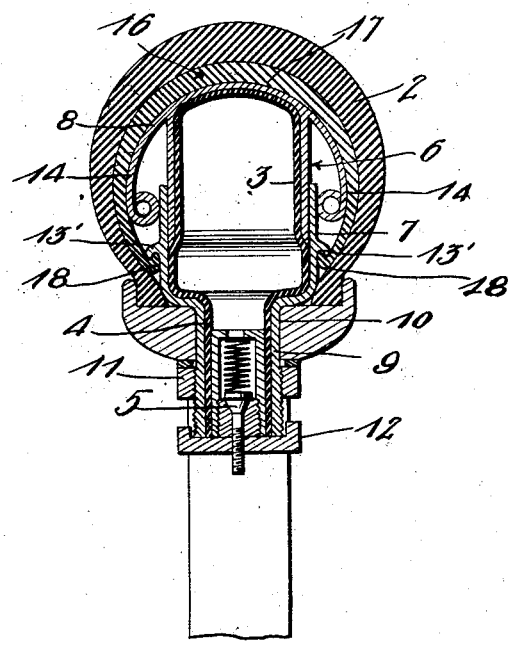
Witnesses
J. R. Pierce
O. B. Hopkins
Inventor
F. A. Macon.
by H. B. Willson & Co.
Attorneys

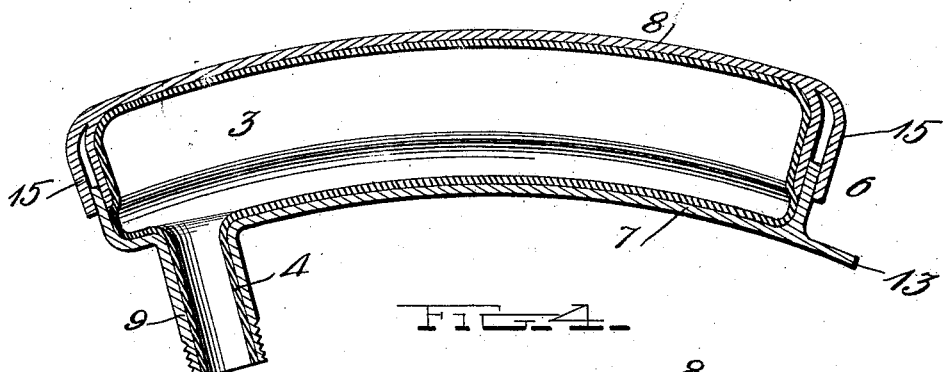
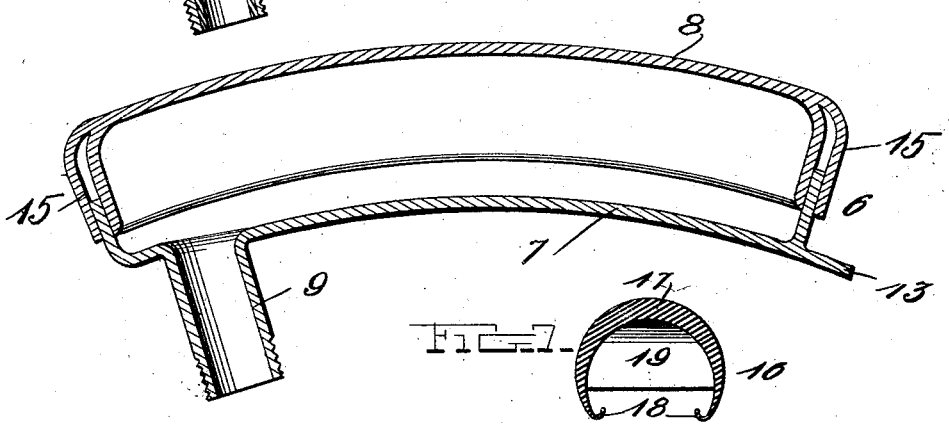
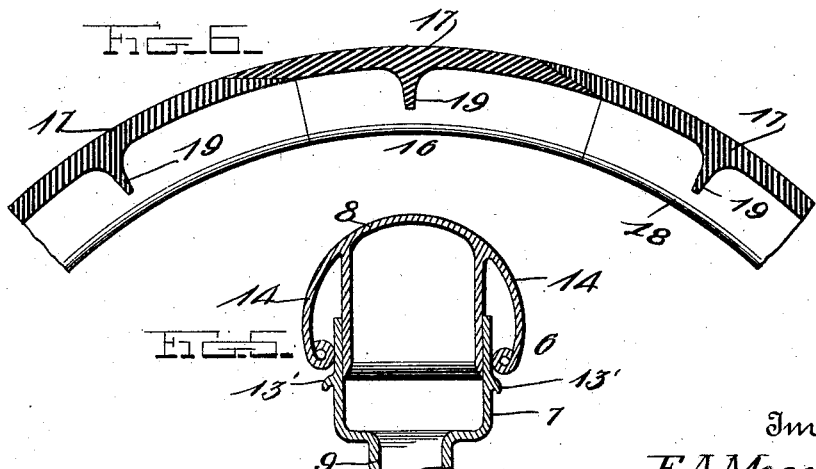

UNITED STATES PATENT OFFICE.

FRANCIS ATHERTON MACON, OF HENDERSON, NORTH CAROLINA.

PNEUMATIC TIRE.

997,398.  Specification of Letters Patent.  Patented July 11, 1911.

Application filed February 20, 1911. Serial No. 609,721.

*To all whom it may concern:*

Be it known that I, FRANCIS A. MACON, a citizen of the United States, residing at Henderson, in the county of Vance and State of North Carolina, have invented certain new and useful Improvements in Pneumatic Tires; and I do declare the following to be a full, clear, and exact description of the invention, such as will enable others skilled in the art to which it appertains to make and use the same.

This invention relates to improvements in pneumatic tires.

One object of the invention is to provide an inner pneumatic tire comprising a plurality of independent collapsible air chambers adapted to be separately inflated.

Another object is to provide means for protecting the air chambers of the tire from puncture without interfering with the resiliency of the same.

A further object is to provide means whereby any of the collapsible air chambers may be removed and replaced when in a deflated condition without disturbing the other sections or removing the outer tire or casing.

With the foregoing and other objects in view, the invention consists of certain novel features of construction, combination and arrangement of parts as will be more fully described and particularly pointed out in the appended claims.

In the accompanying drawings: Figure 1 is a vertical longitudinal section of a portion of a wheel showing the application of the invention; Fig. 2 is a cross sectional view of the same; Fig. 3 is an enlarged vertical section of one of the collapsible air chambers and its protective casings or boxes; Fig. 4 is a similar view of one of the casing or boxes removed; Fig. 5 is a cross section of the same; Fig. 6 is a longitudinal sectional view of several overlapping sections of the inner rubber casing; Fig. 7 is a cross sectional view of the same.

Referring more particularly to the drawings, 1 denotes the rim and 2 denotes the outer tire or casing of a pneumatic tired wheel. These parts may be of the usual or any suitable construction.

Arranged within the outer tire or casing 2 is my improved pneumatic tire, said tire comprising a plurality of separate independent collapsible air chambers 3 which are formed of thin rubber or any other suitable material adapted to be inflated with air. The air chambers 3 may be of any suitable shape when inflated and are here shown in the form of elongated bags. Near one end of the chambers 3 is formed a neck or valve tube 4 in the outer end of which is arranged any suitable form of air valve 5 by means of which the chamber may be inflated and the air retained therein. Each of the air chambers 3 is provided with a protective casing or box 6, said casings or boxes comprising inner and outer sheet metal sections 7 and 8, said inner sections 7 being preferably of rectangular oblong shape and are engaged with and secured to the inner surface of the wheel rim 1 as shown. Arranged in one end of the bottom of the lower section 7 of the casing is a metal tube 9 which is inserted through a passage 10 in the rim and projects a slight distance beyond the outer side of the rim as shown. The outer end of the tube 9 is threaded and has screwed thereon a nut 11, said nut being screwed up into engagement with a plate on the outer side of the rim whereby the tube and adjacent end of the inner section of the casing are secured to the rim. The tube 9 is of sufficient size to permit the chamber 3 to be passed therethrough and into the casing and to be removed therethrough from the casing when said chamber is in a deflated condition. The tube 9 is also provided to hold the tube or neck 4 of the chamber and to protect said neck and the valve arranged therein. The stem of the valve 5 in the outer ends of the neck 4 of the air chamber is threaded and projects beyond the end of the tube 9 and is adapted to receive a cap 12 which is screwed thereon and into engagement with the outer end of the tube 9 thereby drawing the valve stem outwardly and holding the valve in engagement with its seat.

As hereinbefore stated the tubes 9 fasten one end of the inner sections 7 of the boxes or casings 6 to the rim. The opposite ends of said inner sections are fastened by extending said end of the bottom of the boxes to form lugs or flanges 13 which are adapted to be inserted beneath the adjacent fastened ends of the adjoining boxes or casings as shown. On the opposite sides of the inner sections 7 or the casings are formed longitudinally disposed hook shaped flanges 13' the purpose of which will be hereinafter described. The outer sections 8 of the boxes or casings 6 fit in and have a telescoping engagement with the inner sections as shown. The outer sections 8 are curved or rounded on their outer sides to confrom to the curvature of the inner surface of the outer tire or casing 2 and on each side of said outer sections 8 are arranged longitudinally disposed supporting plates 14, said plates projecting laterally to form curved projections and have their lower edges bent inwardly in the form of coils between which and the adjacent sides of the sections 8 the inner sections of the casing slide. On the ends of the outer sections 8 are also arranged guard plates or flanges 15 which lap over and slidably engage the outer sides of the ends of the inner sections 7 of the boxes. The laterally projecting plates 14 serve as forms to support the sides of the outer casings of the tire whereby a proper curvature is imparted to said casing.

Arranged over the boxes or casings 6 of the air chambers is an inner flexible casing 16 constructed of rubber or other suitable material. The casing 16 is formed of a series of substantially U-shaped sections 17 which are thicker at their tread portions and which fit around the sections of the boxes or casings 6. On the inner edges of the sections 17 are formed inwardly and upwardly projecting attaching flanges 18 which are engaged with the hook shaped flanges 13' on the opposite sides of the inner sections 7 of the boxes 6 whereby said sections 17 of the inner casing 16 are secured in place. The ends of the sections 17 are preferably tapered or beveled to an edge and said tapered edges are adapted to overlap thus providing practically a continuous casing. The ends of the sections 17 overlap over the central portion of the upper sections 8 of the boxes 6 and on the inner side of each of the sections 17 is formed an inwardly extending tapered flange 19 said flanges projecting in between the adjacent ends of the boxes or casings 6, whereby said spaces are partially filled.

By forming the inner tire in a series of separate or independent air chambers it will be obvious that should one or two of the latter become deflated from any cause that the tire may still be used. It will be further seen that by incasing the air chambers in metal boxes formed in telescopically engaged sections that the chambers will be effectually protected from puncture or other injury without interfering in any manner with the resiliency of the tire.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a pneumatic tire, a series of independent collapsible air chambers, means whereby said chambers are independently inflated, a protective casing arranged around each of said chambers, said casings comprising boxes formed in inner and outer sections, said outer sections having a telescoping engagement with said inner sections, a tube formed on the bottom of each of said inner sections, said tube being adapted to be inserted through the rim of a wheel whereby this end of the casings are secured to the rim, lugs formed on the opposite end of the sections and adapted to be inserted beneath the fastened ends of the adjoining sections whereby said casings are held in place and flanges arranged on the outer sections of the boxes and adapted to slidably engage the outer sides of the inner sections.

2. In a pneumatic tire a series of independent collapsible air chambers, a series of protective casings arranged around said chambers, said casings comprising boxes formed in inner and outer telescoping sections, tubes formed on said inner sections and adapted to be inserted through the rim of a wheel and through which said chambers may be inserted into and removed from said casings when the chambers are in a deflated condition, and an inner flexible casing arranged over the outer side of said boxes.

3. In a pneumatic tire, a series of independent flexible air chambers, a series of protective casings arranged around said chambers, said casings being formed in inner and outer telescoping sections, an inner flexible casing arranged over the outer sections of said boxes, said flexible casing comprising a series of overlapping sections, means to secure said sections to the inner sections of the casings, and an outer tire or casing arranged around said inner casing.

4. In a pneumatic tire, a series of independent flexible air chambers, a series of protective casings arranged around said chambers, said casings comprising boxes formed in inner and outer telescopically engaged sections, hook shaped flanges arranged along the sides of the inner sections of the boxes, an inner flexible casing arranged over the outer sides, said casing being formed in a series of overlapping sections having on their inner edges inwardly turned flanges adapted to engage the hook shaped flanges on the inner sections of the boxes whereby said flexible sections are held in place, spacing lugs formed on the inner sides of said flexible sections and adapted to engage the spaces between the ends of said boxes and an outer tire casing arranged around said inner casing.

5. In a pneumatic tire a series of independent flexible air chambers, protective casings arranged around each of said chambers, said casings comprising boxes formed in inner and outer telescopically engaged sections, guard flanges formed on the ends of the outer sections of the boxes and adapted to slidably engage the ends of the inner sections, a tube formed on the bottom of the inner sections of said boxes, said tubes being adapted to be inserted through the rim of the wheel to which the tire is applied and having threaded outer ends, and nuts screwed on the threaded outer ends of said tubes and into engagement with the rims whereby this end of the boxes or casings is held in place.

In testimony whereof I have hereunto set my hand in presence of two subscribing witnesses.

FRANCIS ATHERTON MACON.

Witnesses:
J. W. BECK,
T. T. HECK.